[11] 3,603,666

[72] Inventors Teiji Uchida;
  Mitsuhito Sakaguchi, both of Tokyo, Japan
[21] Appl. No. 838,870
[22] Filed July 3, 1969
[45] Patented Sept. 7, 1971
[73] Assignee Nippon Selfoc Company, Limited c/o
  Nippon Electric Company, Ltd.
  Tokyo, Japan
[32] Priority July 6, 1968, July 6, 1968
[33] Japan
[31] 43/46963; 43/46964

[54] LIGHT BEAM DEFLECTION CONTROL DEVICE WITH GRADIENT INDEX LIGHT GUIDE
1 Claim, 2 Drawing Figs.

[52] U.S. Cl. ........................................... 350/96 R,
  350/175 GN
[51] Int. Cl. ........................................... G02b 5/14
[50] Field of Search ................................... 350/96,
  150, 96 WG, 175 GN

[56] References Cited
UNITED STATES PATENTS
3,083,123 3/1963 Navias ........................ 350/175 GN UX
3,320,114 5/1967 Schulz ........................ 350/96 B X
3,434,774 3/1969 Miller ........................ 350/96 WG UX OTHER REFERENCES
Smith, Article in "IBM Technical Disclosure Bulletin" Vol. 6 No. 12, May 1964, pgs. 52 and 53 cited copy in 350/150

*Primary Examiner*—David H. Rubin
*Attorney*—Sandoe, Hopgood and Calimafde

ABSTRACT: A light beam deflection control device includes an elastic fibrous converging light guide having a refractive index greatest along the guide axis. The guide is disposed in a predetermined configuration having an incident light end face and an emitting light end. Axially disposed adjacent the incident end face, but longitudinally removed, are means for slightly deflecting a coherent light beam whereby the position from the guide axis on the incident face and the angle of incidence are converted into an amplified angle of emission from the emitting light end.

INVENTORS:
Teiji Uchida
Mitsuhito Sakaguchi

LIGHT BEAM DEFLECTION CONTROL DEVICE WITH GRADIENT INDEX LIGHT GUIDE

BACKGROUND OF THE INVENTION

This invention relates to a light beam deflection control device which enlarges the input light beam deflection angle or functions as a displacement angle mutual converter, by employing a fibrous converging light guide.

Light deflection control devices are used to selectively irradiate arbitrary positions on a plane by a single light spot, such as in display apparatus. Such devices also serve as displacement angle mutual converters for converting the transverse displacement of the position of incidence of a light beam with respect to the optical axis of the light guide, into a deflection angle of the light beam at the output end.

Conventional devices of this kind include a digital light deflection device in which a crystal having an electrooptical effect is combined with a double refraction prism. Another example is a light deflection device in which the refractive index variation due to supersonic wave pressure is utilized for diffraction grating. The former type is inevitably complicated in construction and expensive to manufacture. With the latter the deflection angle is not only inaccurate but also easily affected by environmental conditions, such as temperature.

These conventional devices generally resort, in their deflection-enlarging and displacement deflection functions, to the use of a concave lens. To improve the efficiency in deflection or the displacement deflection conversion, the focal length of the lens must be as short as possible. However, it is very difficult to produce a lens of very short focal length without involving the adverse effect of aberration. Even with a combination of several lenses, the optical system of such a very short focal length cannot be realized at reasonable cost.

OBJECT OF THE INVENTION

It is an object of this invention to provide a light deflection device capable of giving a large deflection angle at a high efficiency in response to a low level control signal.

It is a further object of the invention to provide such a device which is inexpensive, flexible for various applications, and small in dimension.

Briefly stated, the invention is predicated upon the use of a fibrous converging light guide as a flexible position-and-angle-of-incidence-amplifier between its input and output ends.

The above-mentioned and other features and objects of this invention and the manner of attaining them will become more apparent and the invention itself will best be understood by reference to the following description of an embodiment of the invention taken in conjunction with the accompanying drawings, the description of which follows:

FIG. 1 illustrates the principle of the light deflecting and displacing function of the present invention wherein a fibrous converging light guide is employed for transmitting a coherent light beam; and FIG. 2 schematically shows an embodiment of this invention.

DETAILED DESCRIPTION OF THE INVENTION

The aforementioned fibrous converging light guide has a transparent body which allows light rays to pass therethrough along its longitudinal axis and it has a refractive index gradient along its cross section which is highest at the center of the cross section and decreases gradually toward the circumference. Light rays converged into a suitable size in cross section which are incident upon an input end surface of the light guide travel through it oscillating about the axis virtually without reflection at the inside surface of the light guide. This is due to the converging function of the light guide. Thus, the light rays travel through the guide without dispersion.

In "The Bell System Technical Journal," July 1964 issue, pages 1469 to 1479, D. W. Berreman indicates that light rays can be transmitted without dispersion through a gas lens in which a gradient is given to the refractive index of the gas enclosed within a pipe. Thus, this converging solid light guide may therefore be deemed analogous to the gas optical system.

A laser beam of fundamental mode made incident upon an input end surface of such a light guide should have a specific area in its cross section called spot size, which is determined by the refractive index gradient. According to the S. E. Miller report published in "The Bell System Technical Journal," Nov. 1965 issue, pages 2,017 to 2,064, 1 the spot size $W_o$ of a laser light beam of fundamental mode incident thereupon matched with the optical elements is expressed by:

$$W_o = (\lambda_o/\pi n_a)^{(1/2)(1/4)} a,$$

where $\lambda_o$ is the light wave length in free space, when the refractive index $n$ of the light guide at a point of radial distance $x$ from the axis is expressed by:

$$n = n_a(1 - \tfrac{1}{2}ax^2),$$

where $n_a$ is the refractive index on the axis, and "$a$" is a positive constant.

Figure 1:
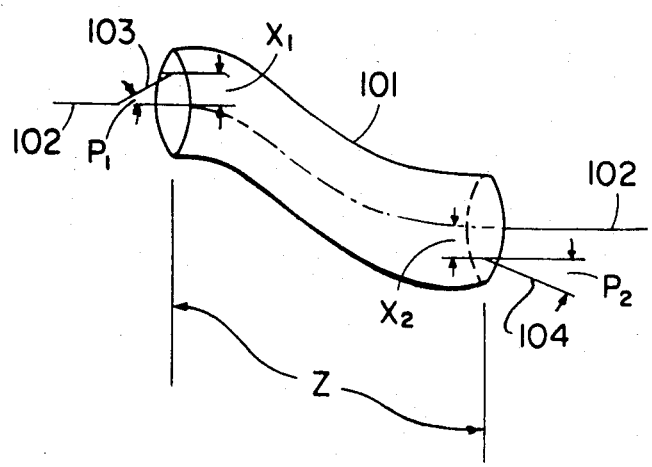

FIG. 1 shows a converging light guide 101 which constitutes an essential part of this invention; the guide having an optical axis 102. An input coherent light beam 103 is incident on one end surface of the light guide and an outgoing light beam 104 emanates from the guide. The angle formed by the input light beam 103 with the axis 102 is $P_1$ and the distance of the position of incidence of the light beam 103 from the light axis 102 is $x_1$. The angle formed by the exiting light beam 104 with the light axis 102 is $P_2$ and the distance of the position of emission of the output light beam 104 from the light axis 102 is $x_2$. The length of the light guide 101 is Z. There is a relationship between $x_1$, $P_1$, $x_2$ and $P_2$ as follows (See Herwig Kogelnik, "Imaging of Optical Modes—Resonator with Internal Lenses," "The Bell System Technical Journal," Mar. 1965, pages 455 to 494):

$$\begin{pmatrix} x_2 \\ P_2 \end{pmatrix} = \begin{pmatrix} \cos(\sqrt{a} \cdot Z) & \frac{1}{\sqrt{a}} \sin(\sqrt{a} \cdot Z) \\ -\sqrt{a} \sin(\sqrt{a} \cdot Z) & \cos(\sqrt{a} \cdot Z) \end{pmatrix} \begin{pmatrix} x_1 \\ P_1 \end{pmatrix}$$

Assuming that the axial length Z of the converging light guide is determined so as to satisfy the condition $\sin(\sqrt{a} \cdot Z) = 1$, then the relation $P_2 = -\sqrt{a} x_1$ is obtained from the above-mentioned relationship. In other words, when a light beam 103 is applied at a distance $x_1$ from the axis, the light beam is transmitted in the converging light guide 101 without reflection. The resultant outgoing light beam 104 emanates from the light guide in the direction defined by the angle $P_2$ which is proportional to $x_1$.

With the present level of manufacturing facilities and technology, the constant "$a$" can be made to about $10^2$ cm.$^{12}$. Therefore, if the input light beam 103 is displaced by 0.1 mm., the angle of the outgoing light beam can be changed to 0.1 rad. This angular conversion is several tens of times as great as a conventional device which uses an ordinary lens.

By employing the converging light guide, displacement angle conversion can be carried out with high efficiency in response to a deflection control signal. Since the converging light guide is flexible, this conversion can be realized with an arbitrary angle and direction by simply bending the light guide and without resorting to any reflecting mirror or prism.

Figure 2:
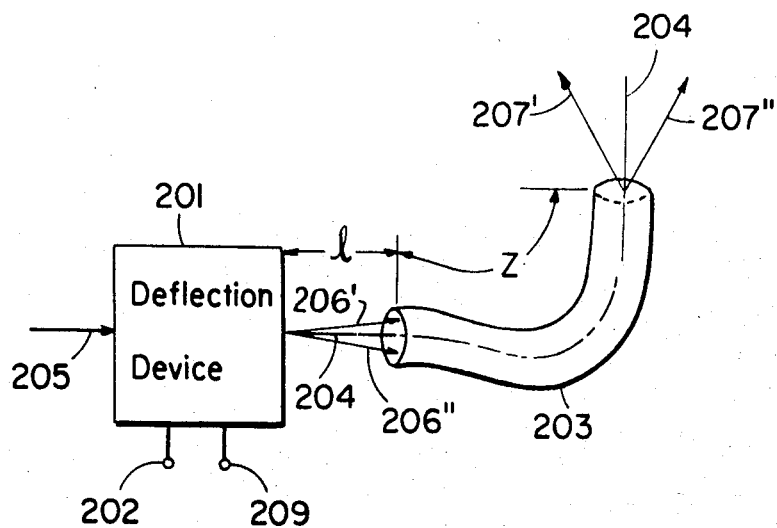

In FIG. 2 which shows an embodiment of this invention light deflection device 201 brings about a variation in the refractive index of a medium in response to an external signal applied to terminals 202 and 209 in order to preliminarily deflect light beam 205. An example of such a deflection device is described by Charles E. Baker in the "IEEE Spectrum," Dec. 1968, pages 39–50. The optical axis 204 of converging light guide 203 is placed in coincidence with that of the light deflection device 201. The device and guide are separated by a distance $l$.

In operation, a light beam 205 is applied to the light deflection device 201 along the light axis 204. In response to a maximum signal voltage applied to terminals 202 and 209, the input light beam is deflected by deflection device 201 to take the optical path 206'. On the contrary, when the signal is in its minimum, the incident light beam 205 is deflected to path 206''. The deflection angle attainable by an ordinary light deflection device is less than 1°. Namely, the angle formed between the outgoing light beam 206' and 206'' is considered to be less than 1°. The light beam 206' or 206'' emanating from the light deflection device 201 is applied to the converging light guide 203. When the length $Z$ of the light guide is determined to satisfy the condition $\sin(\sqrt{a}\,Z)=1$, an outgoing light beam 207' or 207'' is emitted in the direction defined by an angle represented by the product of $\sqrt{a}$ and the distance from the light axis in the input plane of the light guide 203 to the light beam 206' or 206''. In other words, the angle formed by the light beam 207' or 207'' with the axis 204 is enlarged by a factor of $\sqrt{a}\,l$, in comparison with the angle formed by the light beam 206' or 206'' with the axis 204. In this case, the outgoing light beam 207' or 207'' causes a small displacement with respect to the light axis 204. However, this displacement is negligible since the deflection angle of the light deflection device 201 is very small.

In view of the present level of manufacturing facilities and technology, if $l=1$ cm., the angle formed by the light beam 207' or 207'' with the light axis 204 can be made 10 times larger than that formed by the light beam 206' or 206'' with the light axis 204. More specifically, if the maximum deflection angle of the light deflection device 201 is 1°, the light deflection device of this invention becomes capable of deflecting the given light beam up to 10°.

According to this embodiment, as has been explained, a converging light guide is combined with a light deflection device in which the refractive index is varied in response to an external signal, whereby the light beam is greatly deflected in response to an external signal. In addition, since the converging light guide is flexible, the outgoing light beam can be directed in the desired direction or position by simply bending the light guide without resorting to any reflecting mirror or prism.

The invention has been described in conjunction with an embodiment employing a single converging light guide. The similar operation to that described above may be realized by use of two or more light guides arranged in cascade or in series.

Although the invention has been described in conjunction with the embodiment wherein only one-dimensional deflection is carried out, it is easy to modify the embodiment to two-dimensional light deflection by disposing two light deflection devices in a crossed relationship.

In the foregoing description, the nature of the incident light beam has not been specified. However, the above-described operation can be achieved even when the light beam is modulated in time domain.

While the principles of the invention have been described in connection with specific apparatus, it is to be clearly understood that this description is made only by way of example, and not as a limitation to the scope of the invention.

What is claimed is:

1. A light beam deflection control device comprising:
    an elastic fibrous converging light guide, having a refractive index which is greatest along the guide axis and decreases towards the surface, disposed in a predetermined configuration having an incident light end face and an emitting light end, the refractive index gradient being expressed by $n$ wherein $n=n_a(1-\frac{1}{2}ax^2)$ where $n_a$ is the refractive index on the axis, $x$ is the distance from the axis, and $a$ is a positive constant, the length of said light guide being expressed by Z wherein $\sin(\sqrt{a}\,Z)=1$; and
    means longitudinally disposed from the incident end of said guide for directing a coherent light beam upon said guide face whereby the position from the axis and angle of incidence of the light beam at said surface are converted into a position from the axis and angle of emission from said emitting light end;
    wherein said directing means comprises means for slightly deflecting an input coherent light beam in response to a deflection control signal supplied thereto whereby the deflection attained by said deflecting means is enlarged by said light guide.